April 25, 1950        J. W. COGHLAN        2,505,278
SAW CLAMPING AND FILING MACHINE
Filed Feb. 27, 1948        3 Sheets-Sheet 1
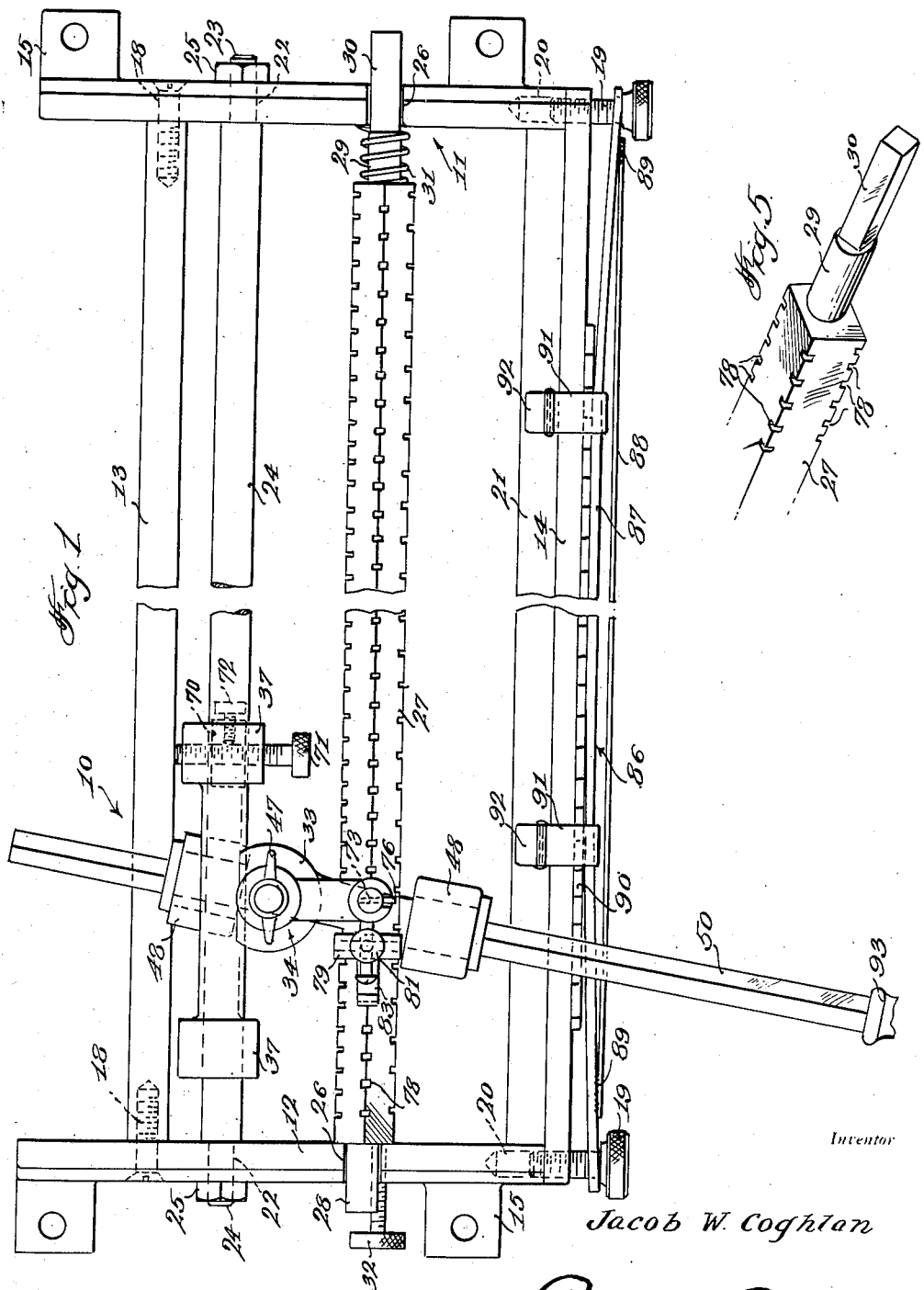
Inventor
Jacob W. Coghlan
By Randolph & Beavers
Attorneys

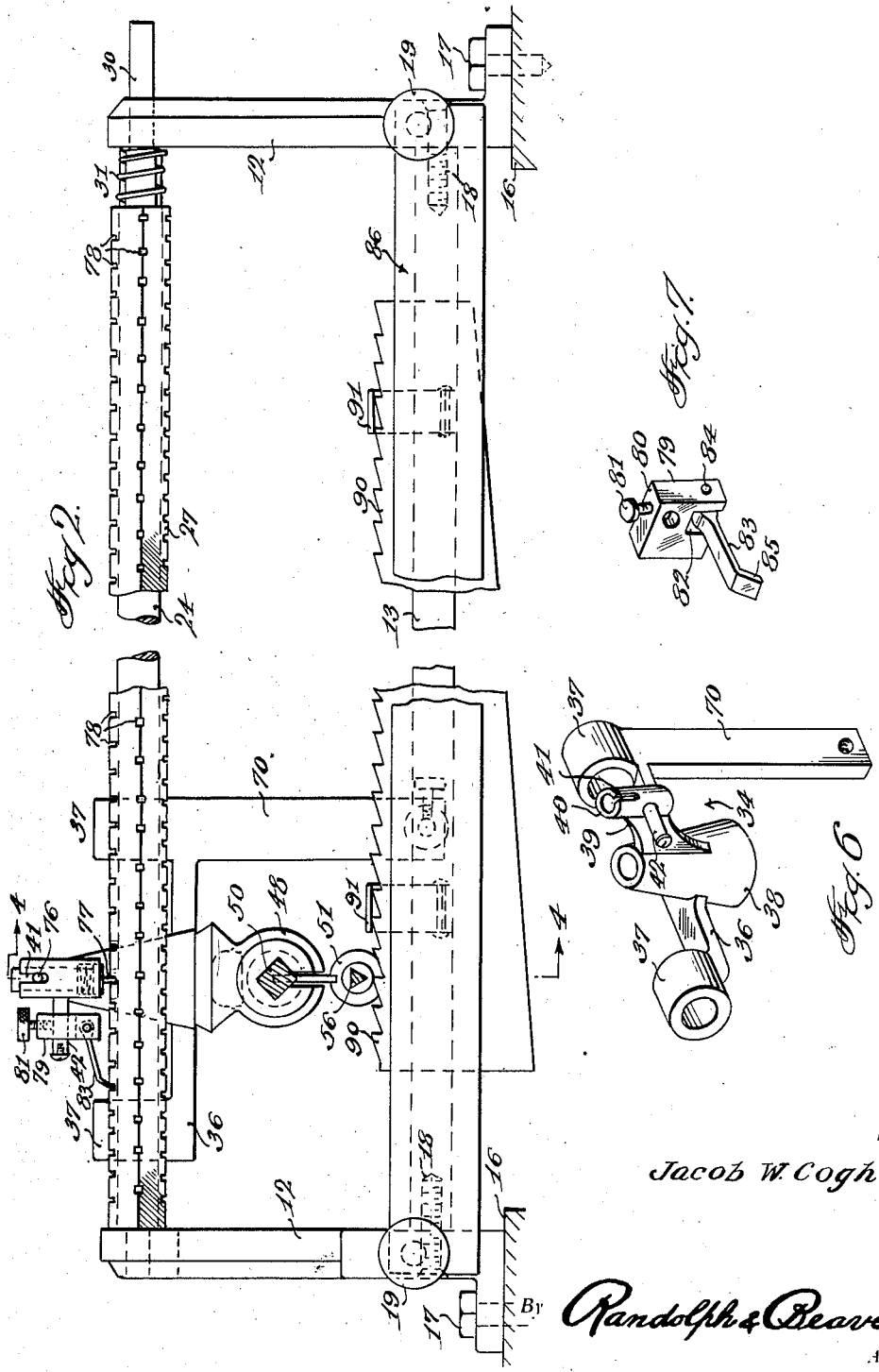

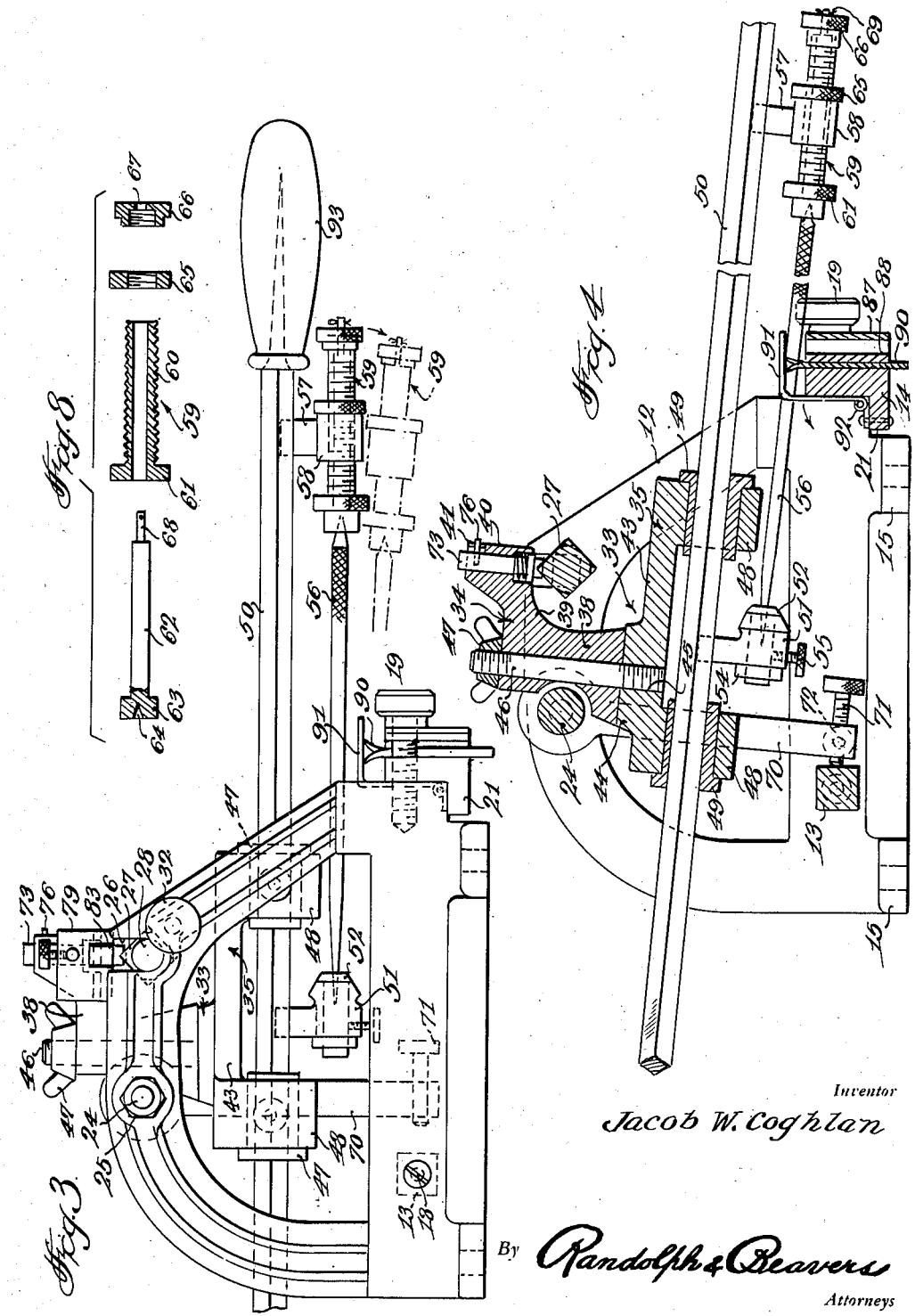

Patented Apr. 25, 1950

2,505,278

UNITED STATES PATENT OFFICE 2,505,278

SAW CLAMPING AND FILING MACHINE

Jacob W. Coghlan, Pueblo, Colo.

Application February 27, 1948, Serial No. 11,692

5 Claims. (Cl. 76—33)

This invention relates to an improved saw clamping and filing machine and more particularly to improvement on my prior U. S. Letters Patent 2,256,016, issued September 16, 1941 and entitled Saw clamp and file guide.

Among the objects of the present invention in addition to those set forth in my prior patent, heretofore referred to, are to provide an improved structure whereby a file can be readily supported for reciprocal engagement with the teeth of a saw held by the invention and may be readily displaced longitudinally of the saw a distance equal to the distance between the centers of adjacent teeth by improved pawl and rack bar means and through the simple expedient of swinging the file support upwardly away from the saw and then downwardly and back toward the saw.

A further object of the invention is to provide pawl and rack bar means for effectively locking the saw support in its adjusted position with respect to each of the recesses of the teeth to insure sharpening the teeth uniformly.

Still a further object of the invention is to provide means for adjusting the pawl and rack bar and latch means to accommodate saw teeth of different sizes and whereby said rack bar means may be initially displaced relatively to the frame of the machine for accurately positioning it relatively to the teeth of a saw clamped by the machine frame.

Numerous other objects and advantages of the invention will hereinafter become more fully apparent from the following description of the drawings, illustrating a presently preferred embodiment thereof, and wherein:

Figure 1 is a top plan view of the improved saw clamp and file guiding machine;

Figure 2 is a front elevational view thereof;

Figure 3 is an end elevational view of the same looking from left to right of Figure 1;

Figure 4 is a cross sectional view of the machine taken substantially along a plane as indicated by the line 4—4 of Figure 2;

Figure 5 is a fragmentary perspective view of one part of the machine;

Figure 6 and Figure 7 are fragmentary perspective views of other parts of the machine, and Figure 8 is an exploded view partly in side elevation and partly in longitudinal section of another unit of the machine.

The improved saw clamp and file guiding machine, constituting the invention, is designated generally 10 and includes a frame, designated generally 11 and which is composed of corresponding end members 12, a bar 13 and a bar 14.

The end members 12 each include a pair of outturned foot members 15 which are adapted to rest upon a suitable supporting surface as indicated at 16 and which are apertured to receive fastenings 17 for detachably anchoring the frame to the supporting surface 16. Each of the end members 12, which is disposed in an upright position relatively to the surface 16, when secured thereto as illustrated in Figure 2, is provided with an opening in the lower rear portion thereof to receive a machine screw 18 which extends inwardly therethrough. The bar 13 is disposed longitudinally of the frame 11 and between the end portions 12 thereof and is provided with threaded recessed ends for receiving the machine screws 18 and whereby said bar is anchored to the end members 12 and functions to connect said members. As illustrated in Figure 4, the bar 13 is preferably of non-circular cross section. The bar 14 is disposed against the forward edges of the lower portions of the end members 12 and in a vertical plane and is provided adjacent the ends thereof with openings to loosely receive machine screws 19 which extend therethrough and into threaded recesses 20 of the end members 12 and so that said bar 14 also functions to connect the end members 12. The bar 14 is provided with an inwardly extending ledge or shelf 21 at its lower end and for a purpose which will hereinafter become apparent. The upper portion of each end member 12 is provided with an opening 22 through which extends the restricted threaded end 23 of a rod 24 which likewise extends between said end members 12 and which is secured thereto by nuts 25 which engage the threaded rod ends 23 and which bear against the outer sides of the end members 12. Each of the end members 12, forwardly of its opening 22, is provided with an upwardly opening notch 26. A rack bar 27 which is preferably of square cross section, as illustrated in Figure 4, is disposed between the end members 12 and is provided with a restricted stem 28 at one end thereof which engages one of the notches 26 and a restricted stem projects from the opposite end thereof and which includes an inner portion 29 which is preferably of circular cross section and an outer portion 30 which is preferably of square cross section and with the sides thereof disposed at forty-five degree angles to the sides of the rack bar 27. Said portion 30 fits with two oppositely disposed sides into the notch 26 of the other end member 12 and is of a width to prevent its rotation in said notch so as to retain the rack bar 27 with one edge thereof facing upwardly. The restricted portion 29 carries an expansion coiled spring 31 which bears against an end of the rack bar 27 and the last mentioned end member 12 for urging said rack bar from right to left of Figure 1. The end member 12 in which the shank 28 is engaged, is provided with a threaded opening adjacent its notch 26 for receiving a setscrew 32 which extends inwardly therethrough for engaging the end of the rack bar 27, located adjacent thereto, and so as to displace said rack bar from left to right of Figure 1 within the frame 11 and against the action of the expansion spring 31, when the setscrew 32 is advanced inwardly of the frame and for a purpose which will hereinafter become apparent.

A file guide, designated generally 33, includes an upper section, designated generally 34 and a lower section, designated generally 35. The upper section 34, as best illustrated in Figure 6, is formed from a single casting and includes a bar 36 having upstanding aligned sleeve portions 37 at each end thereof which slidably engage the rod 24 for slidably supporting the file guide 33 thereon for movement lengthwise of the frame 11. The bar 36 is also provided with a sleeve portion 38 which is offset transversely from the sleeves 37 and which is disposed at a right angle thereto and an arm 39 extends outwardly from the sleeve portion 38 in a direction away from the bar 36 and provides a support for a smaller sleeve 40 which is likewise disposed at right angles to the sleeves 37 and which is provided with an upwardly opening notch 41 and a laterally projecting stem 42.

As best seen in Figure 4, the lower file guide section 35 includes a bar 43 having an upstanding enlargement 44 adjacent one end thereof which is provided with a threaded opening 45 extending therethrough and into which is threaded one end of a bolt 46 which is provided with an unthreaded intermediate portion which extends loosely through the sleeve 38 and the upper threaded end of which is engaged by a wing nut 47 for mounting the section 35 beneath the section 34. The ends of the bar 43 are each provided with a depending apertured extension 48 containing aligned bushings 49 having corresponding non-circular bores for receiving a file supporting rod 50 of a similar cross section and which is slidably and non-rotatably disposed in said bushing 49 and supported thereby for reciprocating movement relatively to the file guide 33 and transversely of the frame 11. The file supporting rod 50 is provided with a depending hanger 51 preferably equipped with an insert 52 which is retained therein by a nut 54 and setscrew 55 and which has a recessed inner end as indicated in dotted lines in Figure 4 for receiving one end of a file 56. The rod 50 is provided with a second hanger 57 which depends or extends transversely therefrom and which is provided with a sleeve 58 which aligns with the insert 52 and which is threaded to receive an adjustable file supporting unit, designated generally 59 as best illustrated in Figure 8. The unit 59 includes an externally threaded sleeve 60 which adjustably engages the threaded bore of the sleeve 58 and which is provided with a knurled enlargement 61 at one end thereof through which end is removably inserted a rod 62 having an enlarged head 63 at its outer end provided with a tapered outwardly opening recess 64 for receiving the opposite end of the file 56. A nut 65 is threaded on the sleeve 60 and a cap nut 66 is adapted to be threaded on said sleeve 60 behind the nut 65 and is provided with an opening 67 in its outer end for receiving a restricted extension 68 on the opposite end of the rod 62 and which is transversely apertured to receive a cotter pin 69 for detachably retaining the cap nut 66 on the sleeve 60 and for thereby retaining the unit 59 assembled. It will be readily apparent that with the lock nut 65 backed off from the sleeve 58 the unit 59 can be manually rotated by engaging the fingers with either the knurled head 61 or the cap nut 66 for advancing said unit to engage said last mentioned end of the file 56 in the notch 64 for securing the file 56 between the inserts 52 and said unit 59 after which the lock nut 65 is advanced into a position against the outer end of the sleeve 58, as illustrated in Figure 4, for clamping the unit 59 in its adjusted position.

The file guide section 34, as best illustrated in Figure 2, is provided with a bar portion 70 which depends from the bar 36 and which is provided with a threaded opening in the lower end thereof for receiving a screw 71 which extends rearwardly therethrough and which is adapted to be moved into and out of engagement with the forward side of the bar 13 and which is retained in various adjusted positions by a setscrew 72 which extends into the bar 70 at right angles to the screw 71 and which is adapted to be advanced into engagement with said screw for locking it in adjusted position.

As seen in Figure 4, a stem 73 is reciprocally disposed in the bore of the sleeve 40 and is provided adjacent its lower end with an enlargement or collar 74 which engages the enlarged lower end of the bore of the sleeve 40 and which is reciprocally disposed therein. An expansion coiled spring 75 is disposed in the enlarged lower end of the sleeve 40 on the stem 73 and bears against the collar or enlargement 74 for urging said stem downwardly of the sleeve. The stem 73 is provided with a radially projecting pin 76 which slidably engages the notch 41 thereof to prevent rotation of said stem in the sleeve 40 and to retain said stem so that its lower sharpened end, forming an edge 77 is disposed transversely of the rack bar 27. Said rack bar 27, as best seen in Figure 5, is provided with longitudinally spaced notches 78 in each edge thereof and which notches are spaced different distances apart and staggered relatively to notches of the other edges of the bar 27. It will be readily apparent that the spring 75 will urge the edge 77 into engagement with one of the notches 78 of the uppermost edge of the rack bar 27 and when the portion 77 is disposed in one of said notches, the file guide 33 will be held against sliding movement longitudinally of the frame 11.

Referring to Figure 7, a block 79 is provided with an opening 80 to receive the stem 42 for mounting said block 79 on the file guide section 34. A setscrew 81 extends through an edge of the block 79 into its opening 80 for clamping engagement with the stem 42 for detachably and adjustably securing the block 79 thereon. The lower portion of the block 79 is provided with a recess 82 for receiving an end of a pawl 83 which is pivotally mounted therein on a pin 84 and which is provided with a depending opposite end 85 which is likewise adapted to engage notches of the upper edge of the rack bar 27.

The bar 14 constitutes one element of a clamp and cooperates with a clamping element, designated generally 86 and which includes a longitudinally bowed bar 87 having apertures in the ends thereof through which the bolts 19 loosely extend. A bar 88, which is straight, is disposed on the outer side of the bar 87 and has the ends thereof welded thereto, as seen at 89, adjacent to but spaced from the ends of the bar 87. A saw blade 90 is adapted to be clamped between the outer surface of the bar 14 and the adjacent surface of the bar 87 by tightening the machine bolts 19 for drawing the unit 86 inwardly and toward the bar 17 and for causing the bar 87 thereof to be flexed toward a straightened position for yieldably clamping the saw blade 90 against the bar 14 and with the upper, toothed edge thereof extending to above the upper edges of the bar 14 and the clamping unit 86, as seen in Figure 4.

A plurality of height gauges 91, each constituting an angular bar, are pivotally mounted on the ledge or shelf 21 each by means of a hinge 92 and said height gauges 91 are swingable to positions as seen in Figures 3 and 4 over the bar 14 and clamping element 86 to be engaged by the toothed edge of the blade 90 to limit the height at which said edge can be disposed when clamped in the machine 10, or said height gauges 91 can be swung on their hinges 92 counterclockwise as seen in Figure 4 and out of position over the clamping element 86.

Assuming that a saw 90 is clamped as previously described and as illustrated in the drawings and with its upper toothed edge at the proper level by the employment of the height gauges and so that said toothed edge is in a horizontal plane, after the clamping of the saw has been completed the height gauges are swung to inoperative positions so as not to interfere with the filing of all of the saw teeth. The rack bar 27 is adjusted so that the notches 78 of the uppermost edge thereof will conform properly to the spacing between the teeth of the saw 90 and the setscrew 71 is adjusted to limit the extent that the handle end 93 of the file guide rod 50 can be swung downwardly and accordingly the extent to which the file 56 can sharpen the teeth of the saw 90 and so that each of the teeth will be filed to the same depth. With the wing nut 47 loosened the file guide supporting section 35 is adjusted relatively to the section 34 and clamped in adjusted position so that the file supporting rod 50 will be disposed at the proper angle to the teeth of the saw 90 and will accordingly hold the file 56 at the proper angle for sharpening the saw teeth, depending upon the extent that the saw teeth are flared and which depends upon the type of saw being sharpened. Likewise, if when the file 56 is engaged between two of the teeth of the saw 90 the edge 77 of the lock stem 73 is not disposed to properly register with one of the notches 78 of the uppermost edge of the rack bar 27, by adjustment of the setscrew 32, as previously described, said rack bar 27 may be displaced longitudinally of the machine 10 until the edge 77 seats in one of the uppermost notches 78 for properly registering the rack bar 27 with the teeth of the saw 90 as clamped in the machine 10. With the machine thus assembled and with the file 56 engaging between two of the teeth of the blade 90, the handle 93 is manually engaged to reciprocate the rod 50 in the guide 33 and so that the file 56 will be reciprocated between said teeth for sharpening the teeth. The file guide 50 can be gradually swung downwardly in a clockwise direction as seen in Figure 4 by pressure exerted on the handle 93 as the teeth are thus sharpened and until the screw 71 comes in contact with the bar 13 to prevent further clockwise swinging movement of the parts and to thereby limit the depth to which the teeth of the saw can be sharpened and to insure sharpening of each tooth to the same depth. The description of the operation of the machine 10 up to this point is substantially the same as that of my prior Patent No. 2,256,016, heretofore referred to.

Instead of having to manually displace the file guide 33 longitudinally of the machine frame as in my prior patent, by swinging upwardly on the handle 93 the edge 77 of the stem 73 will be disengaged from the rack bar 27 and the pawl 83 will swing downwardly and will slide from left to right as seen in Figure 2 relatively to the rack bar 27 until its end 85 engages an upwardly facing notch 78 disposed next to the right of the notch previously engaged thereby. By then swinging the handle 93 downwardly, said pawl will force the file guide unit 33 to be displaced to the right a distance equal to the spacing between two of the adjacent upwardly facing notches 78 and so that the edge 77 can engage the next notch to the right of the notch previously engaged thereby and when so disposed will be properly positioned for locating the file 56 between the next two teeth of the saw 90. By repeating this operation, it will be readily apparent that the file guide and parts supported thereby can be displaced step-by-step from left to right longitudinally of the machine frame 11 for accurately positioning the file 56 for sharpening each of the teeth of the saw 90. By loosening the setscrew 81 the block 79 can be adjustably positioned on stem 42 for properly spacing the pawl end 85 from the edge 77 so that both of said portions will simultaneously engage notches 78 of the uppermost bar edge and which spacing will vary according to the variations in the spacing of the notches.

Obviously, the rack bar 27 can be disengaged from the end pieces 12 and turned to position any of the notched edges thereof uppermost and so that the uppermost disposed notches will be spaced to correspond to the spacing of the teeth of the saw clamped in the machine 10.

Various modifications and changes are contemplated and may obviously be resorted to, without departing from the spirit or scope of the invention as hereinafter defined by the appended claims.

I claim as my invention:

1. A saw filing machine comprising a frame, clamping means for detachably clamping a saw blade in said frame, a rod having adjustable means for detachably supporting a file longitudinally thereof, a guide for reciprocally supporting said rod, means for supporting said guide in the machine frame for rotary movement relatively thereto and for reciprocating movement longitudinally of the machine frame, a rack bar mounted in the frame and longitudinally thereof, a latch element yieldably carried by said guide supporting means for selectively engaging spaced notches of said rack bar for selectively positioning the file supporting rod for registry of the file, carried thereby, with the different teeth of the saw, and a pawl pivotally carried by said guide supporting means above the rack bar for swinging movement toward and away from the rack bar, said pawl being displaceable in one direction along said rack bar when the guide supporting means is swung in one direction for elevating the latch element and disengaging it from the rack bar and to position the pawl in closer proximity to the latch element and for engagement with a notch of the rack bar for causing the guide supporting means to be displaced longitudinally of the machine frame when swung in the opposite direction for displacing the file supporting rod longitudinally of the saw to position the file carried thereby for engagement with another tooth of the saw and for displacing said latch element into a position for engaging another notch of the rack bar, said guide supporting means being formed of swivelly connected sections, and means for clamping said sections in a plurality of adjusted positions for angularly adjusting the file and file supporting rod relatively to the machine frame and to the saw blade.

2. A saw filing machine comprising a frame, clamping means for detachably clamping a saw blade in said frame, a rod having adjustable means for detachably supporting a file longitudinally thereof, a guide for reciprocally supporting said rod, means for supporting said guide in the machine frame for rotary movement relatively thereto and for reciprocating movement longitudinally of the machine frame, a rack bar mounted in the frame and longitudinally thereof, a latch element yieldably carried by said guide supporting means for selectively engaging spaced notches of said rack bar for selectively positioning the file supporting rod for registry of the file, carried thereby, with the different teeth of the saw, and a pawl pivotally carried by said guide supporting means above the rack bar for swinging movement toward and away from the rack bar, said pawl being displaceable in one direction along said rack bar when the guide supporting means is swung in one direction for elevating the latch element and disengaging it from the rack bar and to position the pawl in closer proximity to the latch element and for engagement with a notch of the rack bar for causing the guide supporting means to be displaced longitudinally of the machine frame when swung in the opposite direction for displacing the file supporting rod longitudinally of the saw to position the file carried thereby for engagement with another tooth of the saw and for displacing said latch element into a position for engaging another notch of the rack bar, said rack bar being of polygonal cross section and having longitudinal edges each provided with a single row of notches, the notches of the different longitudinal edges of said rack bar being differently spaced for registry with saw blades having differently spaced teeth, and means for displacing the rack bar longitudinally of the machine frame for properly locating the notches thereof relatively to the teeth of the saw to be sharpened.

3. A saw filing machine comprising a frame, clamping means for detachably clamping a saw blade in said frame, a rod having adjustable means for detachably supporting a file longitudinally thereof, a guide for reciprocally supporting said rod, means for supporting said guide in the machine frame for rotary movement relatively thereto and for reciprocating movement longitudinally of the machine frame, a rack bar mounted in the frame and longitudinally thereof, a latch element yieldably carried by said guide supporting means for selectively engaging spaced notches of said rack bar for selectively positioning the file supporting rod for registry of the file, carried thereby, with the different teeth of the saw, and a pawl pivotally carried by said guide supporting means above the rack bar for swinging movement toward and away from the rack bar, said pawl being displaceable in one direction along said rack bar when the guide supporting means is swung in one direction for elevating the latch element and disengaging it from the rack bar and to position the pawl in closer proximity to the latch element and for engagement with a notch of the rack bar for causing the guide supporting means to be displaced longitudinally of the machine frame when swung in the opposite direction for displacing the file supporting rod longitudinally of the saw to position the file carried thereby for engagement with another tooth of the saw and for displacing said latch element into a position for engaging another notch of the rack bar, and means for displacing said rack bar longitudinally of the machine frame for properly positioning the notches thereof relatively to the teeth of the saw blade.

4. A saw filing machine comprising a frame, clamping means for detachably clamping a saw blade in said frame, a rod having adjustable means for detachably supporting a file longitudinally thereof, a guide for reciprocally supporting said rod, means for supporting said guide in the machine frame for rotary movement relatively thereto and for reciprocating movement longitudinally of the machine frame, a rack bar mounted in the frame and longitudinally thereof, a latch element yieldably carried by said guide supporting means for selectively engaging spaced notches of said rack bar for selectively positioning the file supporting rod for registry of the file, carried thereby, with the different teeth of the saw, and a pawl pivotally carried by said guide supporting means above the rack bar for swinging movement toward and away from the rack bar, said pawl being displaceable in one direction along said rack bar when the guide supporting means is swung in one direction for elevating the latch element and disengaging it from the rack bar and to position the pawl in closer proximity to the latch element and for engagement with a notch of the rack bar for causing the guide supporting means to be displaced longitudinally of the machine frame when swung in the opposite direction for displacing the file supporting rod longitudinally of the saw to position the file carried thereby for engagement with another tooth of the saw and for displacing said latch element into a position for engaging another notch of the rack bar, said rack bar being slidably and non-rotatably mounted in the frame and longitudinally thereof, spring means for urging said rack bar toward one end of the frame, and feed screw means for displacing the rack bar toward the opposite end of said frame for adjustably locating the notches thereof relatively to the saw teeth.

5. A saw filing machine comprising a frame, clamping means for detachably clamping a saw blade in said frame, a rod having adjustable means for detachably supporting a file longitudinally thereof, a guide for reciprocally supporting said rod, means for supporting said guide in the machine frame for rotary movement relatively thereto and for reciprocating movement longitudinally of the machine frame, a rack bar mounted in the frame and longitudinally thereof, a latch element yieldably carried by said guide supporting means for selectively engaging spaced notches of said rack bar for selectively positioning the file supporting rod for registry of the file, carried thereby, with the different teeth of the saw, and a pawl pivotally carried by said guide supporting means above the rack bar for swinging movement toward and away from the rack bar, said pawl being displaceable in one direction along said rack bar when the guide supporting means is swung in one direction for elevating the latch element and disengaging it from the rack bar and to position the pawl in closer proximity to the latch element and for engagement with a notch of the rack bar for causing the guide supporting means to be displaced longitudinally of the machine frame when swung in the opposite direction for displacing the file supporting rod longitudinally of the saw to position the file carried thereby for engagement with another tooth of the saw and for displacing said latch element into a position for engaging another notch of the rack bar, and a height gauge pivotally supported by the clamping means adjacent each end thereof, said height gauges having portions disposed over the clamping means, when the height gauges are in operative positions, to be engaged by the toothed edge of the saw to position the toothed edge parallel to the guide supporting means.

JACOB W. COGHLAN.

REFERENCES CITED

The following references are of record in the file of this patent:

UNITED STATES PATENTS

| Number | Name | Date |
|---|---|---|
| 1,076,112 | Guin et al. | Oct. 21, 1913 |
| 1,207,544 | Hanson | Dec. 5, 1916 |
| 2,019,330 | Altman | Oct. 29, 1935 |
| 2,256,016 | Coghlan | Sept. 16, 1941 |
| 2,427,412 | McCulley | Sept. 16, 1947 |